US006401403B1

(12) United States Patent
Oviedo-Reyes

(10) Patent No.: US 6,401,403 B1
(45) Date of Patent: Jun. 11, 2002

(54) STORM SHELTER KIT AND METHOD OF ASSEMBLY WITH MEANS FOR SELECTABLY CONFIGURING A WIND DEFLECTING SOIL MOUND

(76) Inventor: Alfonso Oviedo-Reyes, 346 NW. 119 Ct., Miami, FL (US) 33144

( * ) Notice: Subject to any disclaimer, the term of this patent is extended or adjusted under 35 U.S.C. 154(b) by 0 days.

(21) Appl. No.: 09/661,106

(22) Filed: Sep. 13, 2000

(51) Int. Cl.$^7$ .......................... E04H 1/00; E04H 14/00; E04H 3/00; E04H 5/00; E04H 6/00; E04H 9/00
(52) U.S. Cl. .................... 52/79.1; 52/169.6; 52/712; 52/169.1; 52/169.9; 405/15; 405/16; 405/18; 405/285
(58) Field of Search ................ 52/169.6, 712, 52/79.1, 169.1, 169.9; 405/15, 16, 18, 285

(56) References Cited

U.S. PATENT DOCUMENTS

| | | | | |
|---|---|---|---|---|
| 3,208,410 A | * | 9/1965 | Hayes et al. | 52/79.4 |
| 3,305,252 A | * | 2/1967 | Jureit | 52/79.4 |
| 4,572,711 A | * | 2/1986 | Benson et al. | 405/285 |
| 4,573,298 A | * | 3/1986 | Harkins | 52/404 |
| 6,151,841 A | * | 11/2000 | Green | 52/79.4 |

\* cited by examiner

Primary Examiner—Carl D. Friedman
Assistant Examiner—Chi Q. Nguyen
(74) Attorney, Agent, or Firm—Frank L. Kubler

(57) ABSTRACT

A storm shelter kit is provided including several enclosure wall panels; wall panel interconnection structures for joining the enclosure wall panels together to define an enclosure having side and top enclosure wall portions; and several soil retaining panels for placement around the enclosure for supporting soil placed around and at least partially covering the enclosure wall panels. The storm shelter kit includes at least one set of the soil retaining panels of progressively decreasing height, for placement in series in progressively increasing distances from the enclosure and for receiving soil between the enclosure and the soil retaining panels and between the soil retaining panels, to define a mound of soil of selectable shape surrounding the enclosure and at least partially covering the wall panels. The wall panels preferably are formed of corrugated steel. The soil retaining panels in the at least one set are positioned upright and generally perpendicular to a hypothetical radial line extending from the center of the enclosure, and are sequentially spaced in series outwardly from the enclosure along the hypothetical radial line. The soil retaining panels in the at least one set are placed in series in a sequence of progressively decreasing soil retaining panel heights outwardly from the enclosure.

12 Claims, 5 Drawing Sheets

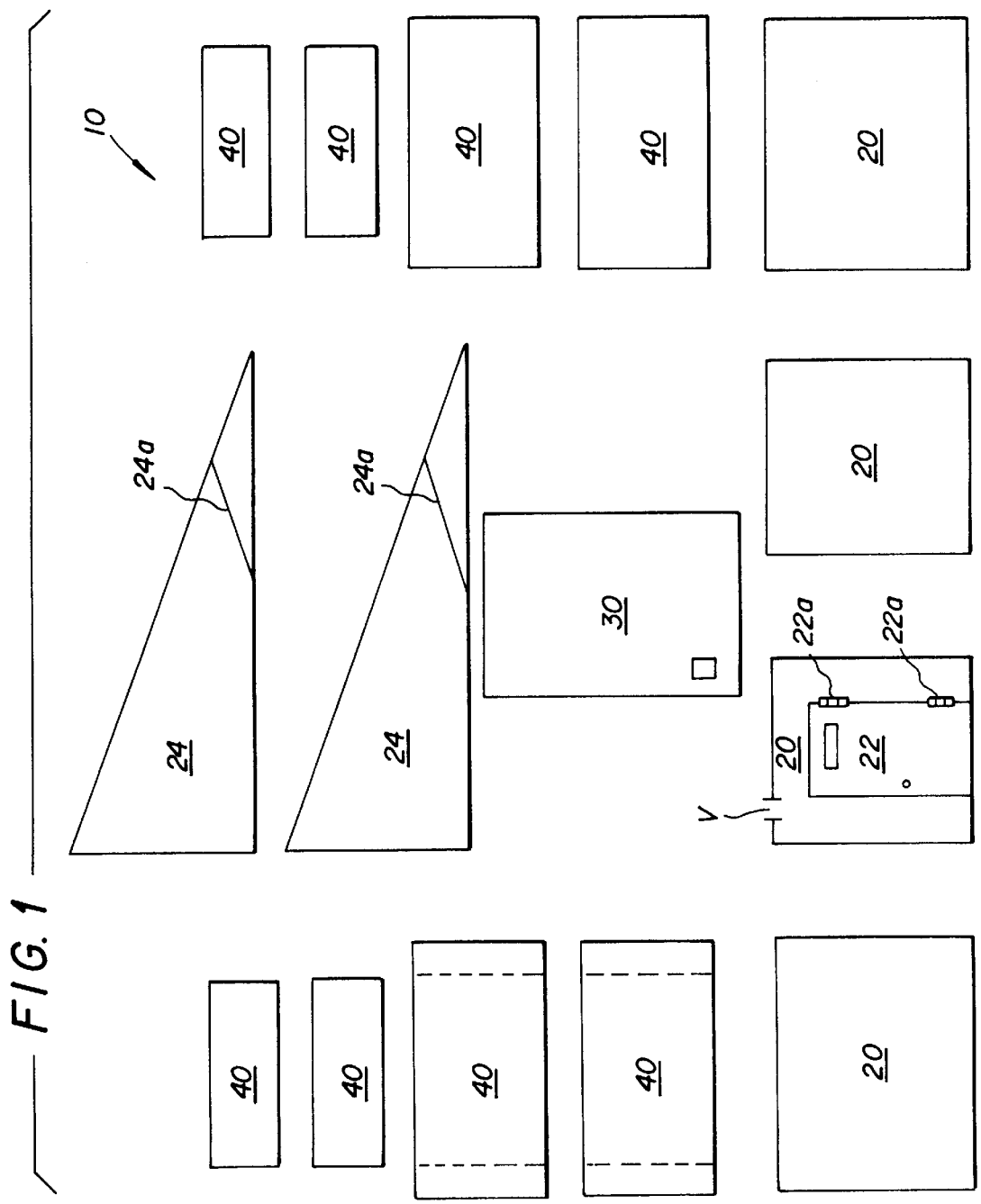

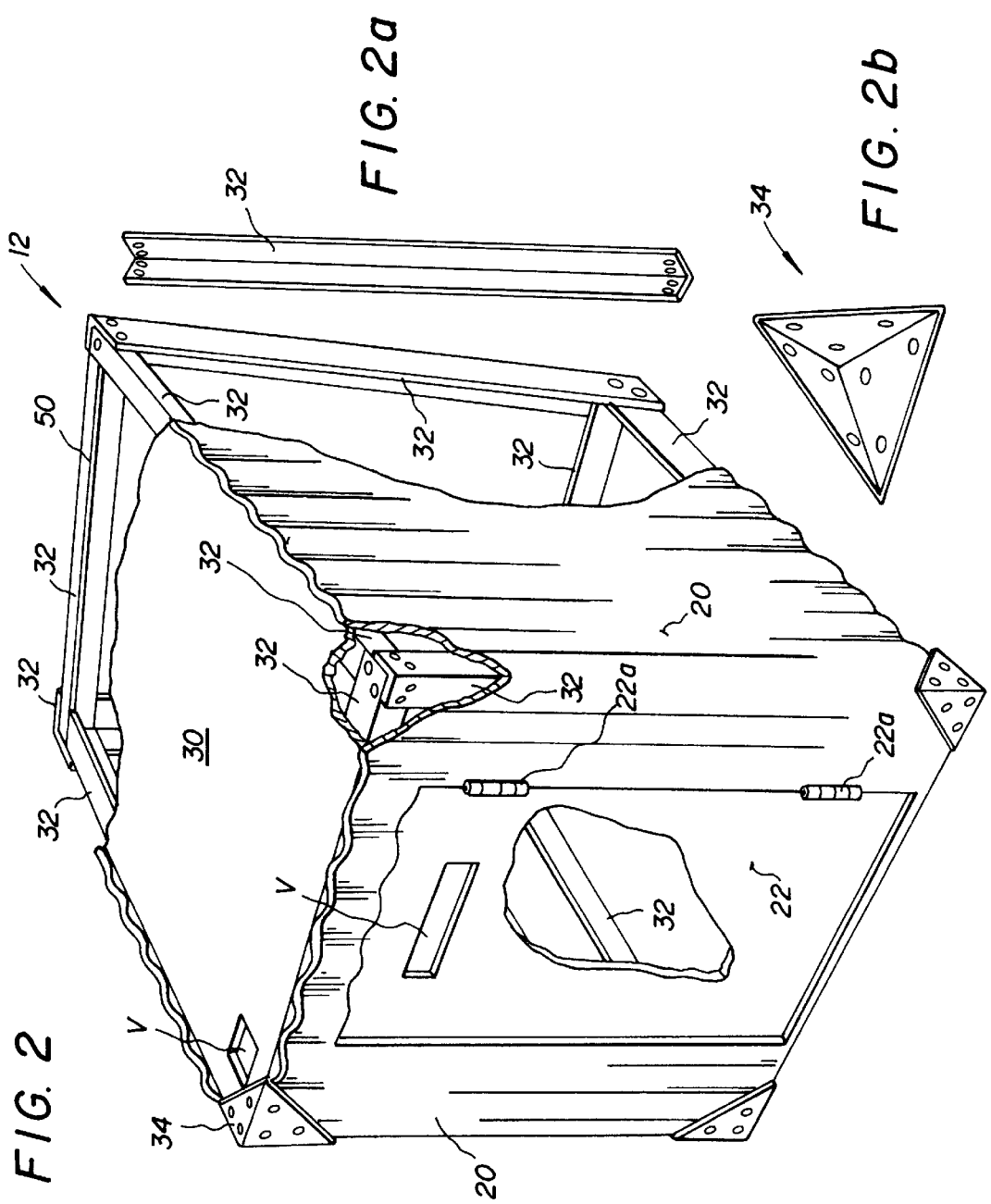

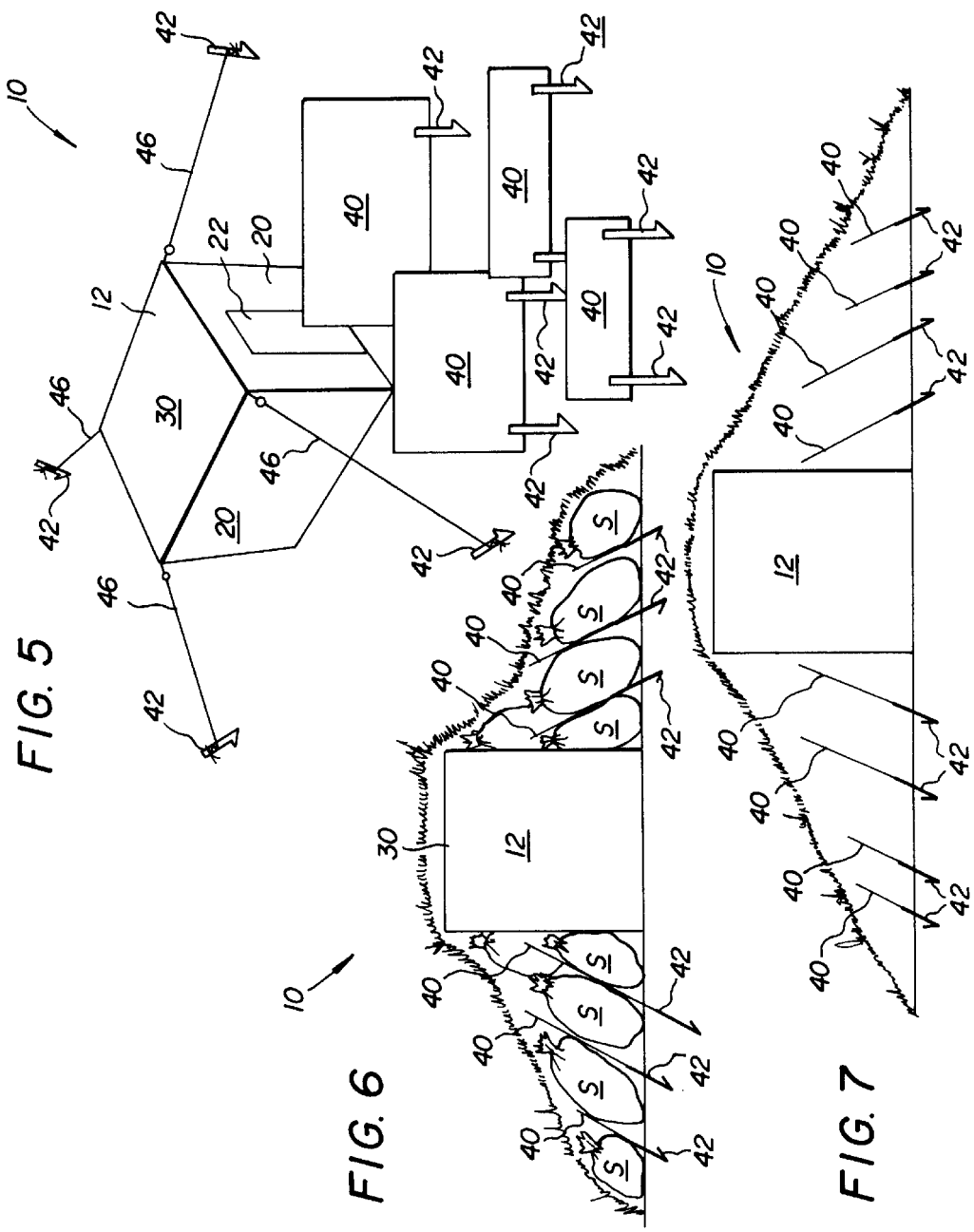

STORM SHELTER KIT AND METHOD OF ASSEMBLY WITH MEANS FOR SELECTABLY CONFIGURING A WIND DEFLECTING SOIL MOUND

BACKGROUND OF THE INVENTION

1. Field of the Invention

The present invention relates generally to the field of safety equipment for protection from natural hazards. More specifically the present invention relates to an enclosure in the form of a bunker for assembly in yards of homes and in community recreation areas. Elements of the enclosure are preferably provided as part of a compact kit for convenient transport and storage, the kit including corrugated steel side and top wall panels, panel interconnection means at panel edges, and soil retaining panels or structures extending outwardly from and around the enclosure.

The enclosure is preferably shaped to deflect the wind so that air flows smoothly over the enclosure without obstruction. This is accomplished by either arranging the soil around the enclosure so that the enclosure is completely covered and the soil forms a continuously and progressively curved surface. The soil support structures are preferably several matching sets of soil retaining panels arranged in a spaced apart series outwardly from the enclosure and in progressively decreasing height.

2. Description of the Prior Art

There have long been cellars and other underground shelters for refuge from tornados, hurricane storm winds and flying debris. Problems with these shelters has been that they are costly and, if there is substantial rain or any flooding, they fill with water. One prior approach to overcome some of these problems has been to construct a shelter taking the form of an enclosure buried in the ground, but has the shortcoming that wind and water can erode the mound around the enclosure, so that protracted storm conditions can place its occupants in jeopardy.

It is thus an object of the present invention to provide a storm shelter kit which is constructed above ground level to minimize the danger of internal flooding and which is compact enough for efficient storage and easy transport.

It is another object of the present invention to provide such a storm shelter kit which includes soil retaining means for retaining soil placed around the enclosure to form a protective cover mound to shield the enclosure against and deflect storm wind, the kit including means for making the mound highly resistant to erosion from high wind and flowing surface water.

It is still another object of the present invention to provide such a storm shelter kit in which the soil retaining means include several series of soil retaining panels of varying heights for arrangement to define the shape of a cover mound as needed.

It is finally an object of the present invention to provide such a storm shelter kit which is inexpensive to manufacture.

SUMMARY OF THE INVENTION

The present invention accomplishes the above-stated objectives, as well as others, as may be determined by a fair reading and interpretation of the entire specification.

A storm shelter kit is provided, including several enclosure wall panels; a wall panel interconnection structure for joining the enclosure wall panels together to define an enclosure having side and top enclosure wall portions; and several soil retaining panels for placement around the enclosure for supporting soil placed around and at least partially covering the enclosure wall panels.

The wall panel interconnection structure includes an enclosure frame having several frame members for assembly into a parallelepiped configuration and several pyramid-shaped brackets, each bracket having three bracket walls mutually perpendicular to each other, each bracket wall having a bracket bolt port and a bolt passing through the bracket bolt port and through one of the enclosure frame members to hold the enclosure frame together. The storm shelter kit preferably further includes at least one set of the soil retaining panels of progressively decreasing height, for placement in series in progressively increasing distances from the enclosure and for receiving soil between the enclosure and the soil retaining panels and between the soil retaining panels, to define a mound of soil of selectable shape surrounding the enclosure and at least partially covering the wall panels. The wall panels preferably are formed of corrugated steel.

The soil retaining panels in the at least one set are positioned upright and generally perpendicular to a hypothetical radial line extending from the center of the enclosure, and are sequentially spaced in series outwardly from the enclosure along the hypothetical radial line. The soil retaining panels in the at least one set are placed in series in a sequence of progressively decreasing soil retaining panel heights outwardly from the enclosure. The soil retaining panels in the at least one set are positioned upright and generally perpendicular to a hypothetical radial line extending from the center of the enclosure, and alternatively are sequentially spaced outwardly from the enclosure in a staggered series relative to the hypothetical radial line. One of the side wall panels preferably includes a door opening and a door secured into the opening with hinges so that the door can be opened and can be closed.

A method is provided of constructing a storm shelter from the above kit having at least two of the soil retaining panel sets including the steps of selecting a desired location for the enclosure; arranging the wall panels to define an enclosure and interconnecting the wall panels with the interconnection structures; measuring the distances from each side of the enclosure that the mound is desired to extend; securing one set of the soil retaining panels in series from a point substantially adjacent to the enclosure to a point more remote from the enclosure; and placing soil between the enclosure and the closest soil retaining panel of each series to the enclosure, and between the soil retaining panels, so that the upper surface of the resulting soil mound is contoured to follow the heights of the soil retaining panels along each the series; so that the horizontal extent of the soil mound in the direction of each the series of soil retaining panels from the enclosure is selected and the soil mound shaped and sized according to this selection.

The method preferably includes the additional steps of dividing each of the measured distances by the number of the soil retaining panels in the given series; marking these divisions on the ground; and placing the soil retaining panels in the given series on each of the divisions. The method preferably includes the additional step of placing each of the soil retaining panels generally perpendicular to a hypothetical line extending radially out from a point within the enclosure.

The method preferably still further includes the additional step of placing the soil retaining panels in each of the series in a sequence of progressively decreasing soil retaining panel heights from the soil retaining panel nearest the enclosure to the soil retaining panel farthest from the enclosure; so that the soil mound tapers from the height of the soil retaining panel closest to the enclosure downwardly to the outermost the soil retaining panel in the given series.

BRIEF DESCRIPTION OF THE DRAWINGS

Various other objects, advantages, and features of the invention will become apparent to those skilled in the art from the following discussion taken in conjunction with the following drawings, in which:

FIG. 1 is a view of the elements of the storm shelter kit placed in rows, omitting the twelve angle irons and eight corner brackets and fasteners for constructing the enclosure frame.

FIG. 2 is a partially cut away perspective view of the enclosure, revealing the angle iron frame and frame brackets omitted from FIG. 1. FIG. 2a is a separate perspective view of one of the angle irons. FIG. 2b is a perspective view of one of the frame brackets.

FIG. 5 is a view generally as in FIG. 4 showing the soil retaining panel in their optional staggered configuration.

FIG. 6 is a cross-section view of the cover mound showing the preferred arrangement of soil retaining panels and enclosure within the mound. The top wall panel of the enclosure is arched into a dome to form the top and follow the curvature of the cover mound.

FIG. 7 is a view as in FIG. 6, where enclosure has a flat top wall panel covered with soil which forms the arched top of the cover mound.

DETAILED DESCRIPTION OF THE PREFERRED EMBODIMENTS

Figure 3A:
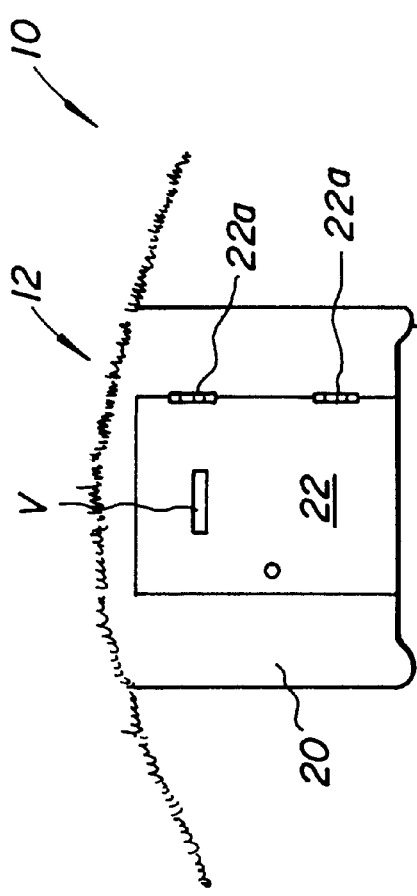
FIG. 3a is a front view of the mound covered enclosure, looking down the path toward the enclosure door, showing the path side ditches in cross-section.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Figure 3:
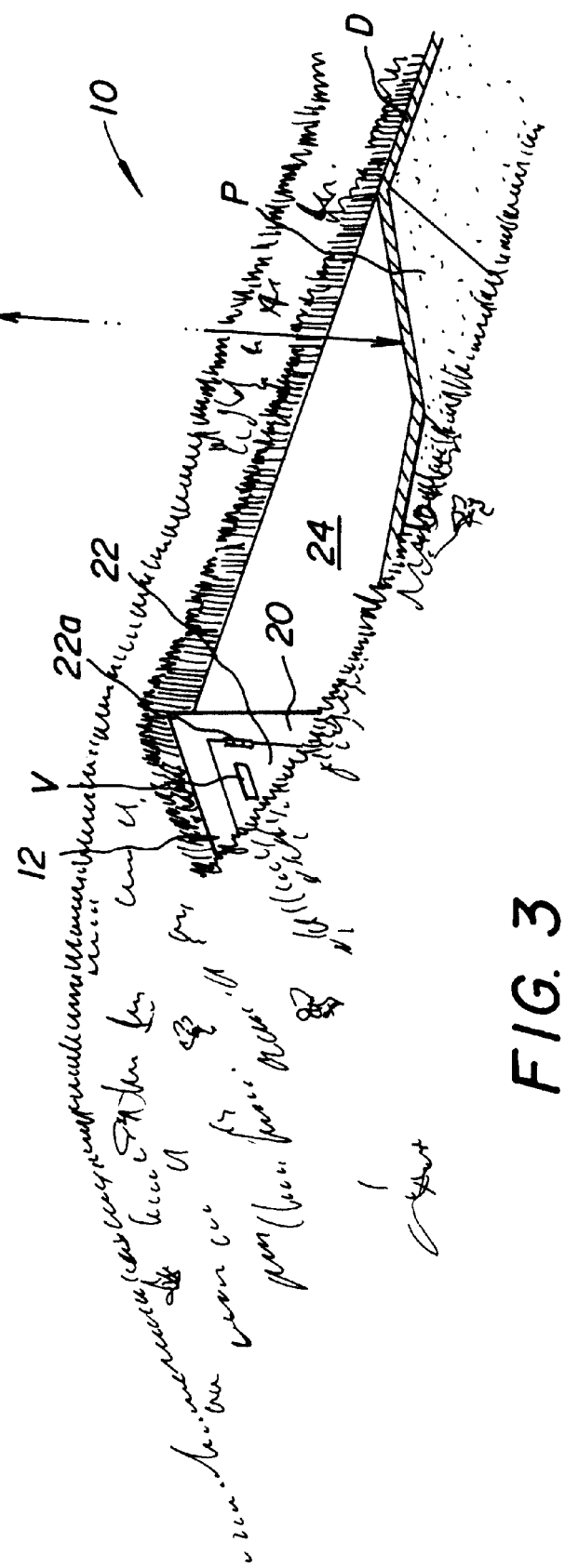
FIG. 3 is a perspective view of the completed storm shelter covered by the mound of soil.
Figure 4:
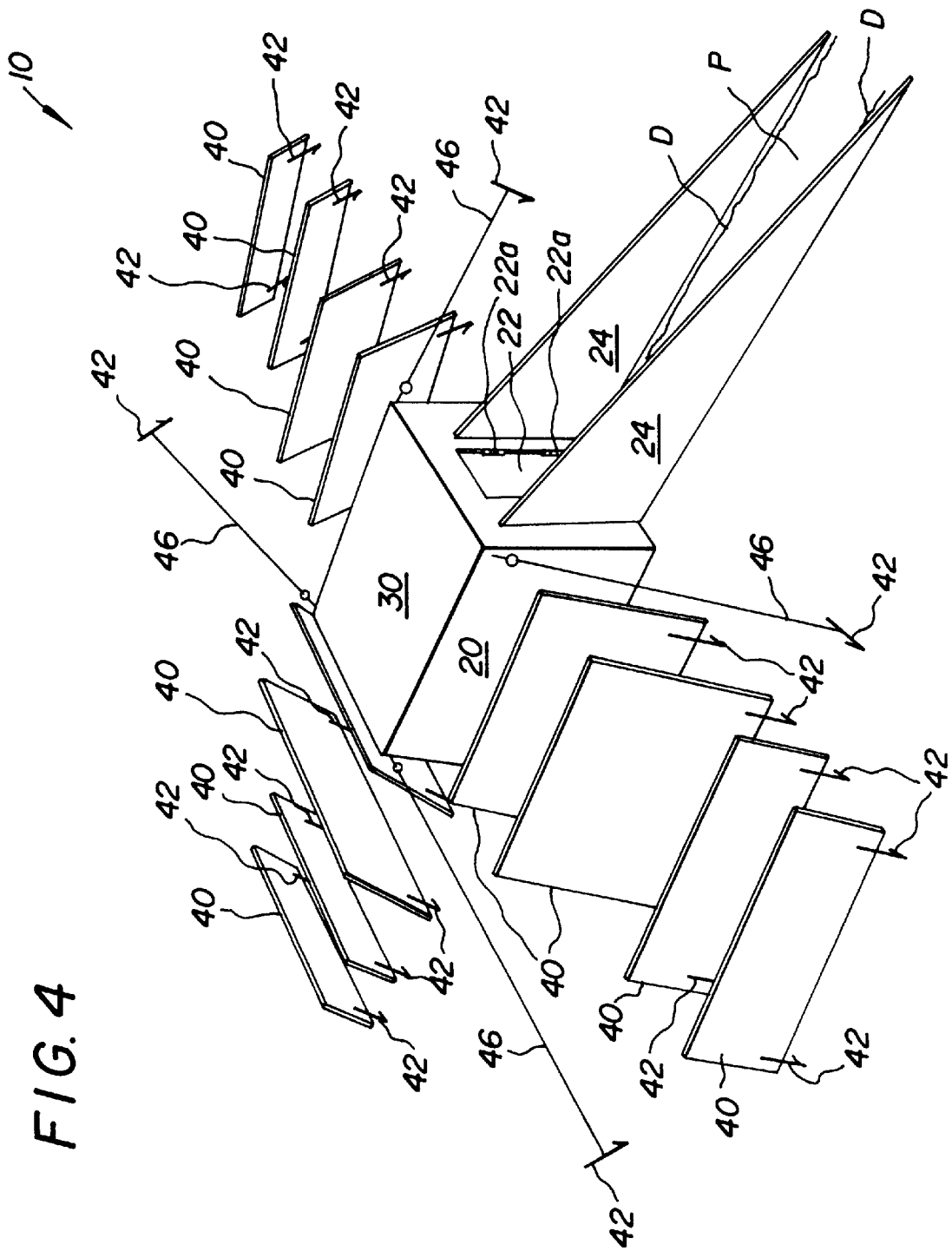
FIG. 4 is a perspective view of the assembled enclosure and the soil retaining panels in place in linear series to receive soil between them to form the cover mound.

Referring to FIGS. 1–7, a storm shelter kit 10 is disclosed. Kit 10 includes enclosure side wall panels 20 and an enclosure top wall panel 30, and panel connecting angle irons 32 fastened together at their ends to form a parallelepiped frame 50 with pyramid-shaped frame brackets 34 made up of three interconnected and mutually perpendicular triangular bracket walls forming a three-dimensional corner. See FIG. 2b. Panels 20 and 30 are placed over the sides and top of frame 50 to form enclosure 12, and frame brackets 34 are fitted over the corners of enclosure 12, and bolts pass through openings in brackets 34, through openings in panels 20 and 30 and through openings in the three intersecting angle iron 32 ends forming each frame 50 corner, securing the angle irons 32 and panels 20 and 30 together to form enclosure 12. See FIGS. 2–2b. One side wall preferably includes a door 22 connected with hinges 22a to an edge of a door opening. Elongate triangular walkway panels 24 are preferably provided to retain soil against intrusion into a path P leading to the door 22, and are preferably bent slightly at line 24a to angle inwardly into the path P to narrow the path open end against wind intrusion. Path P preferably angles downwardly from door 22 outward, and a drainage ditch D is preferably provided along and against the longitudinal base of each walkway panel 24 in path P to drain rain water away from door 22. See FIG. 4. Walkway panels 24 may also swerve somewhat along their length to make the path swerve correspondingly, so that direct wind does not pass through path P and against door 22. See FIG. 3. Kit 10 further includes soil retaining panels 40 of varying heights which are positioned around enclosure 12 to retain soil and define the shape and horizontal extent of a mound 16 of soil 14 either entirely or partially covering enclosure 12. See FIGS. 1–3. Mound 16 and any portion of enclosure 12 extending above mound 16 are preferably shaped to form a continuous curve so that storm winds flow smoothly over enclosure 12 and mound 16 without bearing substantially against any part of enclosure 12 or mound 16.

Side wall and top wall panels 20 and 30 are preferably formed of corrugated steel. Brackets 32 are preferably L-shaped, one leg of the L-shape extending along the face of each adjacent panel 20 or 30 and brackets 32 are secured to panels 20 or 30 with nuts and bolts 34 fitting through holes in the panels. See FIG. 2. A series of two or more of these brackets 32 are preferably provided along each panel edge to be interconnected.

It is preferred that several separate sets of soil retaining panels 40 are provided, the panels 40 in each set being of progressively decreasing height, and each panel 40 being of a width preferably as wide or wider than side wall panels 20 of enclosure 12. Each set of soil retaining panels 40 is positioned so that the panels 40 in each set are upright and generally perpendicular to a hypothetical radial line extending from the center of enclosure 12, and are sequentially spaced outwardly from enclosure 12 in a series either along such a radial line, or are staggered. See FIGS. 4 and 5, respectively. The owner selects the distances between soil retaining panels 40 in each panel 40 series to construct a mound 16 of the desired horizontal extent in the direction of each panel 20 series. The resulting mound 16 may be symmetrical or asymmetrical, as desired by the owner or dictated by existing obstacles in the land around the enclosure 12. The option of staggering panels 40 in each series is a further selective feature of the invention.

Soil retaining panels 20 are affixed to the ground either by fitting them into correspondingly oriented channel ditches and by filling in soil 14 around the base of the individual soil retaining panels 40, or by fastening barbed anchor brackets 42 to the panel 40 lower ends with nuts and bolts 44 generally as described above so that the bracket 42 barbs point downwardly for insertion into the ground. Panels 40 are preferably oriented with their upper edges leaning toward enclosure 12 so that they better deflect storm wind in the event that soil covering them is eroded from the mound surface. See FIGS. 6 and 7. Soil 14 is shoveled between the upright panels 40 to the heights of panels 40, so that the progressively diminishing heights of soil retaining panels 40 defines a soil mound 16 incline from a high point against enclosure 12 outwardly from enclosure 12 to ground level. Conventional sandbags S may be placed between panels 40 for increased speed of mound construction around enclosure 12, and soil filled over and around sandbags S to complete the mound. The curved peak of the mound 16 may be defined by a curved and exposed top wall panel 30 or by soil piled on top of enclosure 12. See FIGS. 6 and 7. The distances between each series of soil retaining panels 40 determines the lateral extent of the mound 16 in the direction of the given panel 40 series, so that the overall shape of the mound 16 is selected. This selectablilty permits construction of a mound 16 which fits well within limited yard or other land space, within the existing obstacles or barriers in one or more directions requiring a specially shaped mound 16. A stabilizing cable 46 is preferably secured to each upper corner of enclosure 12 with conventional fastener means. Each cable 46 angles downwardly from enclosure 12 to the ground, where each cable 46 is fastened to a barbed anchor bracket 42 inserted into the ground. Each cable 46 optionally includes a turnbuckle to create and adjust tension in the cable 46.

Method

In practicing the invention, the following method may be used. The method includes the steps of assembling enclosure 12 from panels 20 and 30 in kit 10; placing the enclosure 12 in the desired location or site; measuring the distance from each side of enclosure 12 that the retaining mound 16 is desired to extend; dividing each of these distances by the number of soil retaining panels 40 provided in each panel 40 set in kit 10, marking these divisions from each side of enclosure 12; securing one of the soil retaining panels 40 at each division generally perpendicular to a hypothetical line extending radially out from the center of the enclosure 12, and most often in a sequence of decreasing soil retaining panel 40 heights from the soil retaining panel 40 nearest the enclosure 12 to the soil retaining panel 40 farthest from the enclosure 12; filling soil in between the closest soil retaining panel 40 and the enclosure 12, in between the soil retaining panels 40 and from the outermost soil retaining panels 40 outwardly from the enclosure 12, so that the upper surface of the resulting mound 16 is contoured to follow the heights of the several panels 40 in each series and thus to taper from the height of enclosure 12 or of the closest panels 40 to enclosure 12 downwardly to meet the ground beyond the outermost panels 40. The horizontal extent of the mound 16 may be caused to vary from each side of the enclosure 12 in the direction of each series, depending on the space constraints and preferences of the owner.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A storm shelter kit, comprising:
a plurality of enclosure wall panels;
wall panel interconnection means for joining said enclosure wall panels together to define an enclosure having side and top enclosure wall portions;
and a plurality of soil retaining panels for placement around said enclosure for supporting soil placed around and at least partially covering said enclosure wall panels;
wherein at least one set of said soil retaining panels is of progressively decreasing height, for placement in series in progressively increasing distances from said enclosure and for receiving soil between said enclosure and said soil retaining panels and between said soil retaining panels, to define a mound of soil of selectable shape surrounding said enclosure and at least partially covering said wall panels.

2. The storm shelter kit of claim 1, wherein said wall panel interconnection means comprises an enclosure frame comprising a plurality of frame members for assembly into a parallelepiped configuration and a plurality of pyramid-shaped brackets, each said bracket having three bracket walls mutually perpendicular to each other, each said bracket wall having a bracket bolt port and a bolt passing through said bracket bolt port and through one of said enclosure frame members to hold said enclosure frame together.

3. The storm shelter kit of claim 1, wherein said wall panels are formed of corrugated steel.

4. The storm shelter kit of claim 1, wherein said soil retaining panels in said at least one series are positioned upright and generally perpendicular to a hypothetical radial line extending from the center of said enclosure, and are sequentially spaced outwardly from said enclosure along said hypothetical radial line.

5. The storm shelter kit of claim 4, wherein said soil retaining panels in said at least one series are placed in a sequence of progressively decreasing soil retaining panel heights outwardly from said enclosure.

6. The storm shelter kit of claim 1, wherein said soil retaining panels in said at least one series are positioned upright and generally perpendicular to a hypothetical radial line extending from the center of said enclosure, and are sequentially spaced outwardly from said enclosure in a staggered sequence relative to said hypothetical radial line.

7. The storm shelter kit of claim 1, wherein at least one of said side wall panels comprises a door opening and a door secured into said opening with hinge means such that said door can be opened and can be closed.

8. A method of constructing a storm shelter from a kit comprising a plurality of enclosure wall panels; wall panel interconnection means for joining said enclosure wall panels together to define an enclosure having side and top enclosure wall portions; and at least one sets of soil retaining panels of progressively decreasing height, for placement in series in progressively increasing distances from said enclosure and for receiving soil between said enclosure and said soil retaining panels and between said soil retaining panels, to define a mound of soil of selectable shape surrounding said enclosure and at least partially covering said wall panels, the method comprising the steps of:
selecting a desired location for said enclosure;
arranging said wall panels to define an enclosure and interconnecting said wall panels with said interconnection means;
measuring the distances from each side of said enclosure that the mound is desired to extend;
securing one set of said soil retaining panels in series from a point substantially adjacent to said enclosure to a point more remote from said enclosure;
and placing soil between said enclosure and the closest said soil retaining panel to said enclosure, and between the soil retaining panels, such that the upper surface of the resulting soil mound is contoured to follow the heights of said soil retaining panels along each said series;

such that the horizontal extent of the soil mound in the direction of each said series of soil retaining panels from said enclosure is selected and the soil mound shaped and sized according to this selection.

9. The method of claim 8, comprising the additional steps of:

dividing each of the measured distances by the number of said soil retaining panels in the given series;

marking these divisions on the ground;

and placing said soil retaining panels in the given series on each of said divisions.

10. The method of claim 8, comprising the additional step of:

placing each said soil retaining panel generally perpendicular to a hypothetical line extending radially out from a point within said enclosure.

11. The method of claim 8, comprising the additional step of:

placing the soil retaining panels in each said series in a sequence of progressively decreasing soil retaining panel heights from the soil retaining panel nearest said enclosure to the soil retaining panel farthest from said enclosure;

such that the soil mound tapers from the height of the soil retaining panel closest to said enclosure downwardly to the outermost said soil retaining panel in the given series.

12. A storm shelter kit, comprising:

a plurality of enclosure wall panels;

wall panel interconnection means for joining said enclosure wall panels together to define an enclosure having side and top enclosure wall portions;

and a plurality of soil retaining panels for placement around said enclosure for supporting soil placed around and at least partially covering said enclosure wall panels;

wherein at least one set of said soil retaining panels is of progressively decreasing height, for placement in spaced series outwardly from said enclosure and for receiving soil between said enclosure and said soil retaining panels and between said soil retaining panels, to define a mound of soil of selectable shape surrounding said enclosure and at least partially covering said wall panels.

\* \* \* \* \*